US010738826B2

(12) United States Patent
Elfert et al.

(10) Patent No.: US 10,738,826 B2
(45) Date of Patent: Aug. 11, 2020

(54) BEARING AND METHOD FOR MONITORING WEAR AND/OR MEASURING A LOAD

(71) Applicants: THYSSENKRUPP ROTHE ERDE GMBH, Dortmund (DE); thyssenkrupp AG, Essen (DE)

(72) Inventors: Gunther Elfert, Erwitte (DE); Joerg Rollmann, Lippstadt (DE); Christopher Stenzel, Soest (DE)

(73) Assignees: THYSSENKRUPP ROTHE ERDE GMBH, Dortmund (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/328,974

(22) PCT Filed: Aug. 24, 2017

(86) PCT No.: PCT/EP2017/071293
§ 371 (c)(1),
(2) Date: Feb. 27, 2019

(87) PCT Pub. No.: WO2018/041702
PCT Pub. Date: Mar. 8, 2018

(65) Prior Publication Data
US 2019/0195278 A1 Jun. 27, 2019

(30) Foreign Application Priority Data
Aug. 30, 2016 (DE) .................. 10 2016 116 113

(51) Int. Cl.
*F16C 19/52* (2006.01)
*F16C 19/18* (2006.01)
(Continued)

(52) U.S. Cl.
CPC ............ *F16C 19/522* (2013.01); *F16C 19/18* (2013.01); *F16C 19/38* (2013.01); *F16C 19/52* (2013.01);
(Continued)

(58) Field of Classification Search
CPC ........ F16C 19/00; F16C 19/18; F16C 19/522; F16C 41/00; F16C 2233/00;
(Continued)

(56) References Cited

U.S. PATENT DOCUMENTS 5,248,939 A * 9/1993 Brauer .................. G01P 13/045
324/174
7,780,357 B2 * 8/2010 Varonis .................. G01P 3/443
324/178
(Continued)

FOREIGN PATENT DOCUMENTS

CN 101236117 A 8/2008
CN 205013495 U 2/2016
(Continued)

OTHER PUBLICATIONS

English Translation of International Search Report issued in PCT/EP2017/071293, dated Nov. 20, 2017.

*Primary Examiner* — Marcus Charles
(74) *Attorney, Agent, or Firm* — thyssemkrupp North America, LLC

(57) ABSTRACT

A bearing or rolling bearing may comprise a stationary first bearing ring and a second bearing ring that is arranged in a rotatable manner about a longitudinal axis relative to the first bearing ring. The bearing may have a first sensor and a second sensor, which are contactless measuring sensors. The first sensor and the second sensor may each have a sensor surface. The first sensor may be positioned opposite an at least partly circumferential reference edge, and the second
(Continued)

sensor may be positioned opposite a reference surface. The first sensor can measure a degree of overlap between the sensor surface of the first sensor and the reference edge. The second sensor can measure a distance, in particular a radial distance, between the sensor surface of the second sensor and the reference surface.

18 Claims, 1 Drawing Sheet

(51) Int. Cl.
    *F16C 41/00*     (2006.01)
    *F16C 19/38*     (2006.01)
    *F16C 19/00*     (2006.01)

(52) U.S. Cl.
    CPC .............. *F16C 41/00* (2013.01); *F16C 19/00* (2013.01); *F16C 2233/00* (2013.01); *F16C 2300/14* (2013.01)

(58) Field of Classification Search
    CPC ...... F16C 2300/14; F16C 19/52; F16C 19/38; G01P 13/045; G01P 3/443; G01P 3/495; G01M 13/04
    USPC ....... 384/448, 452, 490, 504, 513, 495, 516; 324/174, 207.22, 207.23, 207.229; 73/862.338, 862.451
    See application file for complete search history.

(56) References Cited

U.S. PATENT DOCUMENTS

| | | | |
|---|---|---|---|
| 9,267,960 B2 * | 2/2016 | Duppe | G01L 5/0023 |
| 2002/0097040 A1 * | 7/2002 | Takizawa | B60T 8/171 |
| | | | 324/174 |
| 2004/0074315 A1 * | 4/2004 | Hwang | G01L 5/0019 |
| | | | 73/862.333 |
| 2004/0207170 A1 * | 10/2004 | Kapaan | B62D 7/18 |
| | | | 280/93.512 |
| 2005/0031239 A1 * | 2/2005 | Aoki | F16C 33/76 |
| | | | 384/448 |
| 2005/0162154 A1 * | 7/2005 | Mol | G01P 3/487 |
| | | | 324/174 |
| 2006/0245677 A1 * | 11/2006 | Kenworthy | F16C 19/522 |
| | | | 384/448 |
| 2009/0169143 A1 * | 7/2009 | Ozaki | B60B 27/00 |
| | | | 384/448 |
| 2009/0310897 A1 * | 12/2009 | Motohashi | F16C 19/186 |
| | | | 384/544 |
| 2011/0116733 A1 * | 5/2011 | Siraky | F16C 41/00 |
| | | | 384/448 |
| 2012/0078537 A1 * | 3/2012 | Ince | G01M 13/022 |
| | | | 702/42 |
| 2015/0260229 A1 * | 9/2015 | Adane | F16C 41/008 |
| | | | 384/448 |
| 2016/0305527 A1 * | 10/2016 | Chuo | B25J 9/1025 |

FOREIGN PATENT DOCUMENTS

| | | | | |
|---|---|---|---|---|
| CN | 105423889 A | | 3/2016 | |
| DE | 199 19 007 A | | 11/2000 | |
| DE | 10 2006 028 294 A | | 12/2007 | |
| DE | 10 2007 020 940 B | | 12/2008 | |
| DE | 10 2008 038 978 A | | 4/2009 | |
| DE | 10 2008 046 357 A | | 3/2010 | |
| EP | 0 529 354 B | | 9/1994 | |
| EP | 0 922 870 A | | 6/1999 | |
| EP | 1 528 356 A | | 5/2005 | |
| JP | 2005345277 A | | 12/2005 | |
| JP | 2008019933 A | * | 1/2008 | ............ G01L 5/00 |
| JP | 2017166946 A | * | 9/2017 | ............ F16C 41/00 |
| WO | 2008/135123 A | | 11/2008 | |
| WO | WO-2010069705 A1 | * | 6/2010 | ............ F16H 59/70 |
| WO | 2014/090347 A | | 6/2014 | |

* cited by examiner

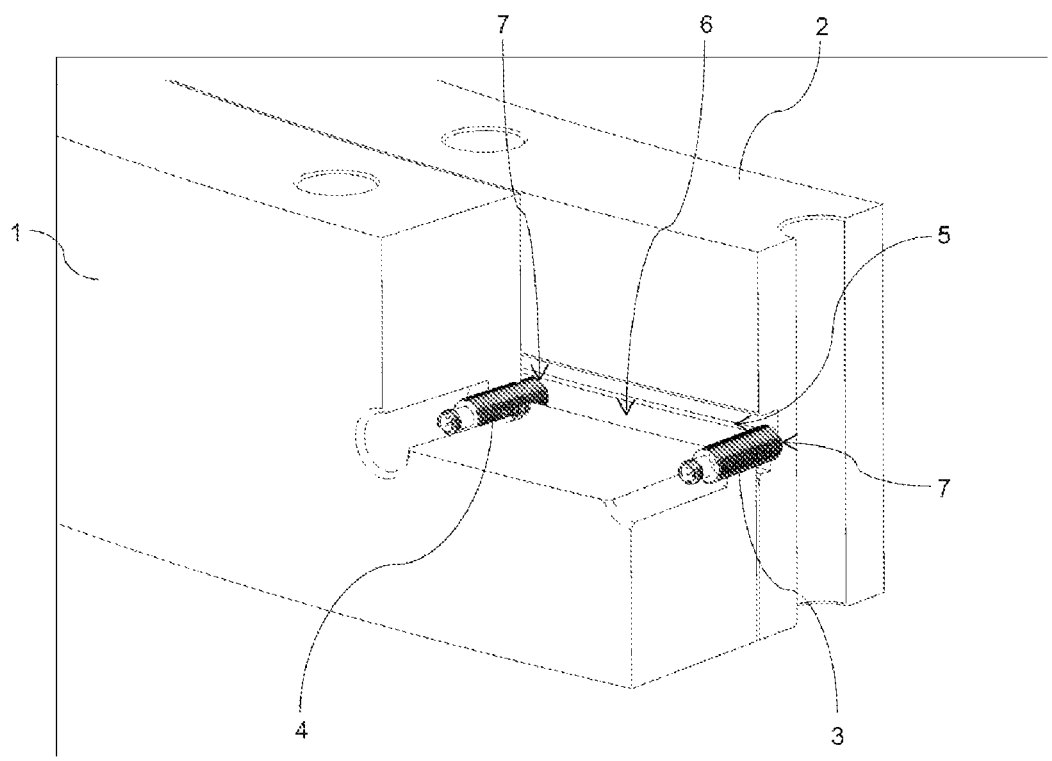

BEARING AND METHOD FOR MONITORING WEAR AND/OR MEASURING A LOAD

CROSS REFERENCE TO RELATED APPLICATIONS

This application is a U.S. National Stage Entry of International Patent Application Serial Number PCT/EP2017/071293, filed Aug. 24, 2017, which claims priority to German Patent Application No. DE 10 2016 116 113.6, filed Aug. 30, 2016, the entire contents of both of which are incorporated herein by reference.

FIELD

The present disclosure generally relates to bearings, including methods for monitoring wear and/or measuring loads in rolling bearings.

BACKGROUND

Bearings are used to guide structural parts movably with respect to each other, for example, by two bearing rings arranged concentrically about each other, one of which is arranged in a rotationally fixed manner, with the rings rolling directly or indirectly against each other. Depending on the size and construction of the bearing, substantial forces may be absorbed. Since such bearings are often installed in hard-to-reach locations, it is desirable to identify the need for servicing of the bearing well in advance, for example on account of wear, in order to keep the down time for the bearing due to servicing as short as possible. Wear usually involves an abrasion of material or damage such as cracks or chipping, especially at the surfaces absorbing the forces.

It is known, for example from EP 0922 870 A1, to install a contact pin in a bore of a bearing ring, the contact pin protruding with a certain play, such as a tenth of a millimeter, in a groove of the oppositely situated bearing ring. If the wear is large enough that the oppositely situated bearing ring touches the contact pin, the pin relays a signal indicating a need for servicing to a corresponding device. The drawback here is that the known solution can only qualitatively recognize a need for servicing, i.e., whether or not wear is present, but does not allow for any quantitative wear measurement.

Furthermore, it is known, for example from the publications WO 2008/135 123 A1, EP 529 354 B1 and DE 10 2007 020 940 B3, to provide high-frequency coils on a cage of a rolling bearing, whereby the coils induce eddy currents in a surface of a bearing ring situated opposite the cage. By measuring the eddy current density, it is possible to ascertain the radial distance from the surface and thus perform a measurement of the load or the wear in the radial direction. The drawback here is that only a radial change in distance is detected. A loading or a wear in the axial direction cannot be identified with these systems.

Finally, it is known from WO 2014/090 347 A1 to provide at least one sensor taking measurements in a noncontact manner opposite a non-steplike contour of a bearing ring. The sensor may be an inductive sensor, a capacitive sensor, an ultrasound sensor or an eddy current sensor. Thanks to the non-steplike contour, such as a ramp or a V-shaped contour, an axial displacement can also be detected. The drawback here, however, is that the radial and the axial components in the event of a combination of radial and axial displacement caused by wear or a loading situation cannot be clearly separated from each other, since in both cases the sensor or the sensors detect a change in distance along the non-steplike contour. In each instance, the contour must be fabricated extremely exactly and the bearing, or at least the sensor, must be adjusted very exactly in relation to the non-steplike contour, requiring substantial labor expense.

Thus a need exists for a bearing with sensors having a simple and compact construction and making possible a comprehensive monitoring of wear, in particular a quantitative measurement of wear, as well as a measuring of load during the ongoing operation. Likewise, a corresponding method is needed to provide for monitoring wear and/or measuring a load.

BRIEF DESCRIPTION OF THE FIGURE

FIG. 1 is a perspective cross-sectional view of an example bearing.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a rolling bearing may comprise, a stationary first bearing ring and a second bearing ring which is arranged in a rotatable manner about a longitudinal axis relative to the first bearing ring. The bearing may have at least a first sensor and a second sensor, and the first sensor and the second sensor may be contactlessly measuring sensors. The first sensor and the second sensor each have a sensor surface, and the first sensor may be arranged opposite an at least partly circumferential reference edge. The second sensor may be arranged opposite a reference surface, and the first sensor may be provided for measuring the degree of overlap be-tween the sensor surface and the reference edge. The second sensor can measure a distance, in particular a radial distance, between the sensor surface and the reference surface.

The bearing according to the invention has the advantage over the prior art that both the wear of the bearing rings and a load acting on them can be measured in a precise and noncontact manner, wherein especially advantageously both the radial wear and the axial wear can be clearly distinguished from each other. Thanks to the use of two sensors measuring in different ways, a relative radial displacement of the bearing rings can be clearly distinguished from a relative axial displacement. Alternatively or additionally, in the same way the sensor according to the invention can also detect loads acting on the bearing separately as axial and radial forces. In the context of this application, by radial is meant a radial direction with respect to the longitudinal axis, i.e., the axis of rotation, and in particular in regard to the second bearing ring. Accordingly, axial means in particular a direction parallel to the longitudinal axis. The reference edge is preferably step-shaped. The sensor surface is especially preferably situated, in a load-free or static starting condition, opposite the reference edge such that the reference edge is arranged substantially centrally in a projection onto the sensor surface. The degree of overlap designates the portion of the sensor surface situated opposite a higher region of the edge, as compared to the portion of the sensor surface situated opposite a lower section of the reference edge, i.e., one situated at a greater distance from the sensor surface, or an adjoining region. In graphic terms, the reference edge in a radial projection divides the sensor surface into two regions, a first region corresponding to a region of the reference edge with a small distance, and a second region corresponding to a region of the reference edge with a larger distance. In a starting condition, the degree of overlap is preferably 50%. This advantageously makes possible a maximum possible relative displacement of the bearing rings in both axial directions, the relative displacement being caused by wear or a loading. Preferably, the region of the reference edge with a greater distance from the sensor surface corresponds at least partly to the reference surface. The second sensor measures a radial distance of the bearing rings from each other and thus a relative radial displacement of the bearing rings caused permanently by wear or temporarily by acting loads. In this way, it is advantageously possible to provide a reliable and at least partly redundant measurement system in a simple and compact manner. The person skilled in the art understands that both the first sensor and the second sensor in the end perform a distance measurement. In particular, the measurement of the degree of overlap with the reference edge also presupposes a (combined) measurement of the distance from the higher and the lower region of the reference edge, i.e., that in particular the relative axial displacement of the bearing rings and thus the axial wear are likewise ascertained indirectly by a radial distance measurement.

Advantageous embodiments and modifications of the invention may be found in the dependent claims, as well as the description, making reference to the drawings.

According to one preferred embodiment of the present invention it is proposed that the first bearing ring is an outer ring and the second bearing ring is an inner ring, wherein the inner ring is arranged preferably concentrically, at least partly inside the outer ring. In this way, a rotary bearing is advantageously provided, in which an imbalance is avoided and a simple measurement is made possible, since—at least in a load-free starting condition—a constant distance from the outer ring is present at every point on the circumference of the inner ring.

According to one preferred embodiment of the present invention it is proposed that the first sensor and the second sensor are provided on the first bearing ring. In this way, it is advantageously possible to provide more easily a wiring of the sensors and/or a data transmission. Most especially preferably, it is provided that the first sensor and/or the second sensor is arranged at least partly in a bore in the first and/or second bearing ring. Even more preferably, the first sensor and/or the second sensor is secured in the bore, for example it is connected by form fit, force locking, and/or material-to-material bonding to the bore, in particular being glued and/or screw fastened. This provides, in especially advantageous manner, an especially compact bearing and in particular it is possible to provide the sensor in the bearing element which is static, i.e., stationary, so that the wiring of the sensor can be done with no problem, for example from the outside through the bore of the outer ring, the sensors being firmly connected to the bearing ring, so that their correct orientation is advantageously assured.

According to another preferred embodiment of the present invention it is proposed that the reference edge and the reference surface are provided on the bearing ring situated opposite the first and the second sensor respectively. Especially preferably, the reference edge and the reference surface are fabricated as a single piece with the respective bearing ring. Most especially preferably, the bearing ring has an at least partly circumferential groove, whereby the groove encloses at least partly the reference edge and/or the reference surface. Such a groove preferably has a width, in particular a constant width, of at least 6 mm to a maximum of 18 mm. Preferably, the groove is comprised of a running surface of the first or second bearing ring. A running surface here is in particular a surface along which the first or second bearing ring and/or one or more rolling elements roll, thus being the surfaces exposed to especially large wear. Especially preferably, the running surface comprises at least partly the reference surface. Preferably, the reference edge and/or the reference surface are completely encircling. An only partly encircling reference edge or reference surface is advisable, for example, in swivel bearings, where the first and the second bearing ring do not perform complete rotations about each other. Thanks to an at least partial integration in the running surfaces it is advantageously possible to minimize the required design space and at the same time perform the wear or load measurements at the most heavily loaded locations.

According to another preferred embodiment it is proposed that the bearing is a multiple-row rolling bearing, in particular a three-row rolling rotary connection, especially preferably a slewing ring. The bearing is preferably intended for use in wind turbines, tunnel drilling machines, cranes, oil drilling machines and/or oil delivery platforms. Such bearings are very large, for example the outer ring has an outer diameter of at least 1 m, preferably at least 1.5 m, especially preferably at least 5 m and most especially preferably at least 20 m, particularly 25 m, and they are hard to service in the installed condition, so that a precise monitoring of wear is especially desirable and advantageous here. The skilled person is aware that, for example in a three-row rolling rotary connection, a third bearing ring can also be provided in addition between the first bearing ring and the second bearing ring. The principle of the invention can be applied to any given number of bearing rings, whereby it may be chosen to arrange a first sensor and second sensor according to the invention only in the first bearing ring or further first and second sensors in the same or further bearing rings.

According to another preferred embodiment it is proposed that the first sensor and/or the second sensor is a capacitively measuring sensor, an inductively measuring sensor, an ultrasound sensor and/or an eddy current sensor. In the context of this invention, it is especially preferably provided that the first sensor and the second sensor is an eddy current sensor. Such an eddy current sensor is designed to detect an eddy current density and it preferably comprises an exciter coil, in particular a high-frequency coil, for generating an electromagnetic field by imposing an alternating current. This magnetic field induces eddy currents in the material being investigated, which is at least partly electrically conductive, in particular. The eddy current sensor detects the magnetic field generated in turn by the eddy currents. The magnetic fields are dampened by the gap between the eddy current sensor and the material, which is filled for example with air and/or a lubricant, i.e., the measurable amplitude of the magnetic field strength is decreased. From this, the distance between a sensor surface of the eddy current sensor and the material can be determined. Eddy current sensors in particular enable distance measurements in the range of 0.1 µm to 10 mm with a resolution in the micrometer range. Therefore, it is provided according to one preferred modification that the bearing, in particular the first and/or the second bearing ring, is made at least partly from an electrically conductive material. Eddy current sensors are advantageously insensitive to dirt and to temperature fluctuations and their contactless measurement process does not contribute to the wear. Hence, by using an eddy current sensor it is especially advantageously possible to perform a precise and easy monitoring of wear and/or measuring of a load.

According to another preferred embodiment it is proposed that the sensor surface of the first sensor and/or the second sensor is an end face of the sensor, wherein the end face has a circular shape in particular. Especially preferably, the first sensor and/or the second sensor is substantially rod-shaped, wherein the end face, i.e., the sensor surface, is arranged in particular parallel to the reference surface and/or the reference edge or an adjacent region. In the event that a groove is provided, which encloses the reference edge and/or the reference surface, the dimensions of the sensor surfaces are preferably coordinated with the dimensions of the groove. For example, in the case of a groove with a width of 12 mm, a circular sensor surface with a diameter of at most 12 mm is provided.

According to another preferred embodiment it is proposed that in a starting condition, i.e., in particular in a load-free condition, the first sensor and/or the second sensor are situated at a distance of at least 5 mm, 6 mm, 7 mm, 8 mm, 9 mm or 10 mm from the reference edge or the reference surface. Especially preferably, the first sensor has the same distance from a higher region of the reference edge as the second sensor has from the reference surface. Most especially preferably, the sensor surface of the first sensor is provided flush with the bearing ring. In this way, a sufficient distance of the bearing rings for the operation of the bearing is advantageously made possible, yet still assuring a precise measurement.

According to one preferred embodiment it is proposed that a plurality of first and/or second sensors are arranged along a circumference of the first bearing ring and/or the second bearing ring. In this way, a technical redundancy of the wear monitoring and/or load measuring is especially advantageously made possible, so that the reliability of the wear monitoring and/or load measuring is enhanced. Furthermore, loads can advantageously be reliably detected in this way in all directions.

A further subject of the present invention is a method for monitoring wear and/or measuring a load with a bearing according to the invention, wherein during an operation of the bearing, in particular during a rotation of the second bearing ring relative to the first bearing ring, the first sensor measures at least temporarily the degree of overlap between the sensor surface and the reference edge and the second sensor measures at least temporarily the distance between the sensor surface and the reference surface.

The method according to the invention advantageously enables a precise and simple wear monitoring and/or load measuring in particular by distance measurements. In this way, it is advantageously possible to identify a need for servicing in good time and thereby minimize down time and/or wear-related damages, as well as better analyze loading situations of the bearing; for example, in order to design the bearing better.

According to one preferred embodiment it is proposed that the first and/or second sensor transmits information in particular to a control unit if the measured value is greater than a predetermined value. In this way, an early warning for wear can be advantageously provided.

According to another preferred embodiment it is proposed that the first sensor and/or the second sensor measures continuously or at predetermined time intervals. Especially preferably, the first and/or second sensor measures at least once per complete revolution of the inner or outer ring. Most especially preferably, however, the first and/or second sensor measures continuously in operation, yet relays its measured data preferably only in predetermined time intervals, in particular once per revolution, and/or when a predetermined threshold value is exceeded. This makes possible in an advantageous manner a secure and continuous wear monitoring or load measuring, wherein the data transmission, however, is provided efficiently. Furthermore, thanks to a regular transmitting of the measured values, it is advantageously possible to ensure a checking of the functioning of the sensors. If one of the transmitters no longer sends any measured data, a malfunction may then be inferred.

According to another preferred embodiment of the method of the invention it is proposed that the first sensor and/or the second sensor perform at least a number of between two and a thousand measurements per complete revolution of the second bearing ring and/or a rolling element, i.e., for example two, four, five, ten, a hundred, etc. In this way it is advantageously possible to prevent the same spot from being always measured, whereby loads or wear at other spots would possibly not be detected. Especially preferably, the first and/or the second sensor measure in time intervals, in particular regular intervals, whereby the rotating time for one complete revolution of the second bearing ring is not an integer multiple of the time intervals. In this way, it is advantageously possible to measure and check each spot of the bearing ring over a long-lasting measurement process. This also advantageously enables a distinction between wear and a load, since wear always occurs at the same measured spot of the bearing ring, while a load is always detected by the same sensor. Thus, if several first and/or second sensors are provided, a local wear and a local damage would be detected in succession by the sensors according to the rotation of the second bearing ring, while in the case of a load acting on the bearing substantially constant measured values would be measured by the sensors.

According to another preferred embodiment of the method of the invention it is proposed that the data measured by the first sensor and/or the second sensor is processed, in particular filtered, in such a way that a wear is distinguished from a load-induced deformation. This advantageously makes possible a load measuring, in particular as distinguished from a wear measuring or monitoring. The skilled person understands that wear causes in particular a constant relative displacement of the bearing ring with respect to each other, while on the other hand a load causes a temporary deformation and thus a temporary relative displacement. Furthermore, it is possible for wear to cause a uniform ablation of material and thus bring about a substantially constant change in the distance of the first bearing ring from the second bearing ring along substantially the entire circumference of the bearing rings, while a loading has in particular a direction of loading, so that the largest absolute distance change occurs at two opposite sides on the circumference of the bearing rings, while only a smaller absolute distance change occurs at other locations. Preferably, the bearing has a plurality of first and second sensors for this purpose, being distributed along the circumference. Hence, by evaluating the measured values of all the sensors, as explained in the preceding paragraph, wear can advantageously be distinguished from a loading situation.

According to yet another preferred embodiment of the method of the invention it is proposed that the bearing comprises a plurality of first sensors and/or a plurality of second sensors, which are preferably arranged distributed along the circumference of the first bearing ring, wherein the first sensors and/or the second sensors are interconnected and/or the measured data is evaluated in such a way that a tilting of the first bearing ring relative to the second bearing ring is identified. In particular, such a tilting occurs such that the second bearing ring has a new axis of rotation, making an angle with the longitudinal axis or the original axis of rotation of the bearing or the first bearing ring. By evaluating the measured values of all the sensors, a distribution of the axial and the radial relative displacement is indicated. A tilting can be represented by a combination of axial and radial relative displacement of the bearing rings and it differs from a pure axially parallel axial or radial relative displacement especially in that not all sensors arranged along the circumference measure the same displacements. Instead, for example, sensors set off from each other by 180° along the circumference will detect different displacement directions. In this way, it is especially advantageously possible to detect a wear- and/or load-related tilting of the bearing rings. Since a tilting may lead to severe damage to the bearing, it is desirable and advantageous to recognize such a tilting in good time.

Further details, features and benefits of the invention will emerge from the drawings, as well as the following description of preferred embodiments with the aid of the drawings. The drawings merely illustrate exemplary embodiments of the invention which do not limit the essential notion of the invention.

FIG. 1 illustrates a perspective cross-sectional drawing of a bearing according to one exemplary embodiment of the present invention. The bearing here is a slewing ring such as is used for example, but not exclusively, in wind turbines. Such a slewing ring has for example an outer diameter of around 2.5 m. Other areas of application and other bearing designs, such as those with intermeshing teeth instead of roller bodies, or a swivel bearing instead of a rotary bearing, are likewise possible, of course.

The bearing has a static, i.e., fixed or stationary first bearing ring 1, here, an outer ring 1, as well as a second bearing ring 2 arranged concentrically in the outer ring 1, here, an inner ring 2. The inner ring 2 here is rotatable about an axis of rotation or longitudinal axis running centrally through the inner ring 2, i.e., the inner ring 2 is rotatable with respect to the outer ring 1. In the outer ring 1 there are provided two continuous bores at a spacing from each other and running in the radial direction, a first sensor 3 and a second sensor 4 being arranged in the bores. The sensors 3, 4 in the present instance are eddy current sensors. The sensors 3, 4 are substantially rod-shaped and secured in the bores, e.g., by gluing. The sensors 3, 4 have an end face, being circular here, which corresponds to a sensor surface 7.

The first sensor and the second sensor are arranged with respect to the inner ring 2 such that the first sensor 3 lies opposite the middle of a reference edge 5. The reference edge 5 is preferably step-shaped, as depicted here, and it has in particular a 90° angle to the edge. The reference edge 5 borders on two regions, one region with a small distance from the sensor surface 7 and one region with a large distance from the sensor surface 7. The two regions are situated parallel to each other and parallel to the sensor surface 7 of the first sensor 3.

The second sensor 4 is arranged such that it lies opposite a reference surface 6, wherein the sensor surface 7 of the second sensor 4 is oriented parallel to the reference surface 6. The reference surface 6 may be a running surface, i.e., a surface on which for example the first bearing ring 1 and the second bearing ring 2 roll against each other or against the roller bodies which are in contact with the first bearing ring 1 and the second bearing ring 2. The reference edge 5 and the reference surface 6 here are adjacent to each other and fashioned as part of a groove, having for example a width of around 12 mm to 15 mm. Accordingly, the first sensor 3 and the second sensor 4 here have a diameter of around 12 mm to 15 mm, wherein in particular the first sensor 3 is identical in design to the second sensor 4, so that the second sensor 4 fits into the groove without the reference edge 5 lying in a radial projection onto the sensor surface 7 of the second sensor 4. This means that the second sensor only measures a distance to the reference surface 6.

The eddy current sensors preferably comprise, in addition to a sensor unit for detecting an eddy current density, in particular by a measurement of magnetic fields, an exciter coil, which generates high-frequency fields when an alternating current is applied. These high-frequency fields induce eddy currents in the material being probed, i.e., in this case the material in the area of the reference edge 5 or the material in the area of the reference surface 6. These, in turn, generate magnetic fields, which are detected by the eddy current sensors. The magnetic fields are dampened by the distance between the reference edge 5 and the sensor surface 7 of the first sensor 3 or between the reference surface 6 and the sensor surface 7 of the second sensor 4, i.e., the detectable magnetic field strength has a lesser amplitude in particular. The gap between material and sensor 3, 4 may be for example an air gap and/or be filled at least partly with a lubricant. Thus, by the eddy current measurement, it is possible to determine the distance between the material and the sensors 3, 4. The reference edge 5 and the reference surface 6, or the material in these areas, is at least partly electrically conductive, i.e., at least partly made of an electrically conductive material. In this way, the second sensor 4 can measure a distance between its end face, i.e., the sensor surface 7, and the reference surface 6. A change in this distance, for example a decreasing of the distance, then points to wear or a load acting on the bearing.

The first sensor 3 measures a degree of overlap of the reference edge 5 with the sensor surface 7. Since the reference edge 5 lies in a radial projection in the region of the sensor surface 7 of the first sensor 3, the first sensor 3 measures in part both a small distance from the higher region of the reference edge 5 and also in part a larger distance from the lower region of the reference edge 5. Thus, the degree of overlap indicates which portion of the sensor surface 7 is overlapped by which region of the reference edge, or in other words where the reference edge 5 is situated in a radial projection on the sensor surface 7. This is expressed by a combined distance measurement from the two regions of the reference edge 5. Under an axial load or under axial wear, the first bearing ring 1 and the second bearing ring 2 are displaced relative to each other in the axial direction, i.e., the position of the reference edge 5 changes in relation to the sensor surface 7. Accordingly, the degree of overlap changes. In particular, by taking into account the distance from the reference surface 6 as measured by the second sensor 4, which preferably corresponds to the distance from the lower region of the reference edge 5, it is thus possible to determine information as to the axial (relative) displacement.

The skilled person understands that, by an appropriate interconnection of a plurality of first sensors 3 and/or a plurality of second sensors 4, further measurements become possible, such as a measurement of a tilting between inner ring 2 and outer ring 1. In the event of a tilting about a point of the (original) longitudinal or rotation axis, for example, two first sensors 3 arranged with an offset of 180° around the circumference would measure opposite changes in the degree of overlap. Two further first sensors 3, in turn arranged with an offset of 180° to each other, but 90° from the previously described first sensors 3, on the other hand in the optimal situation, i.e., in an optimal orientation of the sensors relative to the tilting axis, would measure no change or at least the same change in the degree of overlap.

In particular, a distinct division into an axial and a radial displacement component is made possible by a combination of the measurement results of the first sensor 3 and the second sensor 4.

LIST OF REFERENCE NUMBERS

1 First bearing ring, outer ring
2 Second bearing ring, inner ring
3 First sensor
4 Second sensor
5 Reference edge
6 Reference surface
7 Sensor surface

What is claimed is:

1. A bearing comprising:
a stationary first bearing ring;
a second bearing ring that is rotatable about a longitudinal axis relative to the stationary first bearing ring;
a first sensor disposed opposite an at least partly circumferential, step shaped reference edge, with the first sensor having a sensor surface, wherein the first sensor is configured to measure a degree of overlap between the at least partly circumferential, step-shaped reference edge and the sensor surface of the first sensor; and
a second sensor disposed opposite a reference surface, with the second sensor having a sensor surface, wherein the second surface is configured to measure a distance between the reference surface and the sensor surface of the second sensor,
wherein the first and second sensors are contactless measuring sensors.

2. The bearing of claim 1 configured as a rolling bearing.

3. The bearing of claim 1 wherein the distance that the second sensor measures is a radial distance between the reference surface and the sensor surface of the second sensor.

4. The bearing of claim 1 wherein the sensor surface of at least one of the first sensor or the second sensor is an end face of the at least one of the first sensor or the second sensor.

5. The bearing of claim 4 wherein the end face has a circular shape.

6. The bearing of claim 1 wherein at least one of the first sensor or the second sensor is at least one of a capacitive measuring sensor, an inductive measuring sensor, an ultrasound sensor, or an eddy current sensor.

7. The bearing of claim 1 wherein a plurality of the first sensor and/or the second sensor is disposed along a circumference of at least one of the stationary first bearing ring or the second bearing ring.

8. The bearing of claim 1 wherein at least one of the first sensor or the second sensor is disposed at least partly in a bore in at least one of the stationary first bearing ring or the second bearing ring.

9. The bearing of claim 1 configured as a multiple-row rolling bearing.

10. The bearing of claim 1 configured as a slewing ring.

11. The bearing of claim 1 configured as a three-row rolling rotary connection.

12. A method comprising the bearing of claim 1, wherein during a rotation of the second bearing ring relative to the stationary first bearing ring, the first sensor measures the degree of overlap between the at least partly circumferential, step-shaped reference edge and the sensor surface of the first sensor and the second sensor measures the distance between the reference surface and the sensor surface of the second sensor.

13. The method of claim 12 comprising filtering data measured by at least one of the first sensor or the second sensor so as to distinguish wear from a load-induced deformation.

14. The method of claim 12 wherein at least one of the first sensor or the second sensor measures continuously.

15. The method of claim 12 wherein at least one of the first sensor or the second sensor measures periodically.

16. The method of claim 12 wherein the bearing ring comprises a plurality of the first sensor and/or a plurality of the second sensor disposed along a circumference of the stationary first bearing ring, wherein the plurality of the first sensor and/or the plurality of the second sensor are interconnected and/or measured data is evaluated such that tilting the stationary first bearing ring relative to the second bearing ring is detectable.

17. The method of claim 12 wherein the bearing ring comprises a plurality of the first sensor and/or a plurality of the second sensor, wherein the plurality of the first sensor and/or the plurality of the second sensor are interconnected and/or measured data is evaluated such that tilting the stationary first bearing ring relative to the second bearing ring is detectable.

18. The method of claim 12 comprising evaluating data measured from the first sensor and the second sensor to detect tilting of the stationary first bearing relative to the second bearing.

* * * * *